(12) United States Patent
Zuin

(10) Patent No.: US 6,447,313 B1
(45) Date of Patent: Sep. 10, 2002

(54) IC CARD CONNECTOR

(75) Inventor: Gianni Zuin, Padua (IT)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/756,439

(22) Filed: Jan. 8, 2001

(30) Foreign Application Priority Data

Jan. 22, 2000 (EP) .......................................... 00101200

(51) Int. Cl.[7] .............................................. H01R 13/62
(52) U.S. Cl. ...................................... 439/159; 439/325
(58) Field of Search .............................. 439/157–159, 439/325–328

(56) References Cited

U.S. PATENT DOCUMENTS

| | | | |
|---|---|---|---|
| 4,743,746 A | 5/1988 | Murschall et al. | 235/486 |
| 4,926,032 A * | 5/1990 | Shimamura et al. | 235/441 |
| 5,151,847 A | 9/1992 | Rautenberg | 361/395 |
| 6,129,572 A * | 10/2000 | Feldman et al. | 439/328 |

* cited by examiner

*Primary Examiner*—Khiem Nguyen
(74) *Attorney, Agent, or Firm*—Stacey E. Caldwell

(57) ABSTRACT

An IC card connector is provided for connecting an IC card having a terminal array. The connector includes a base member having receptacle means for receiving the IC card for movement between a preload position and a latched position. The base member has a plurality of electrically conductive contacts for engaging the terminal array of the IC card. An ejector member is movably mounted on the base member and is engageable with the IC card for movement therewith between the preload and latched positions. A latch on the base member is engageable with the IC card for locking the IC card in its latched position. A spring is operatively associated between the ejector member and the base member for moving the ejector member and IC card back to the preload position automatically in response to releasing the latch.

13 Claims, 7 Drawing Sheets

IC CARD CONNECTOR

FIELD OF THE INVENTION

This invention generally relates to the art of electrical connectors and, particularly, to an IC card connector for connecting an IC card, such as a multi media card, in an IC card reader system such as a video camera or smartphone or the like.

BACKGROUND OF THE INVENTION

IC cards have been developed and contain IC's (integrated circuits) including memory circuits, such as rams (random access memories), and control circuits, such as CPUs (central processing units). A special type of IC card, called a multi media card (or "MMC") is of increasing interest and is used in small electronic devices such as videocameras, smartphones, music players and the like. Multi media cards normally include a terminal array for connection through a card reader system to the external equipment. The connector usually includes some form of IC card socket and a plurality of electrodes or contacts exposed in the socket for engaging the terminal array of the IC card. The card is inserted into and removed from the socket, and the connector contacts are resilient or comprise springy contacts for yieldably engaging the terminal array of the card when the card is inserted into the socket.

With the ever-increasing miniaturization of IC cards and their respective connectors, various problems continue to arise. For instance, the very handling of the miniature IC cards is difficult, and proper positioning of the cards in the connector presents corresponding problems when the card is inserted into and removed from the card-receiving cavity or other receptacle means of the connector. Such card connectors may have locking means for holding the IC card in a locked reading position, but such locking means often have reliability problems. Still further, it often is very difficult to grip and remove the inserted IC card from the connector. This invention is directed to solving these various problems in a multi media card connector which is reliable and simple to manufacture and assemble.

SUMMARY OF THE INVENTION

An object, therefore, of the invention is to provide a new and improved IC card connector for connecting an IC card having a terminal array, in an IC card reader system or the like.

In the exemplary embodiment of the invention, the connector includes a base member having receptacle means for receiving the IC card for movement between a preload position and a latched position. The base member has a plurality of electrically conductive contacts for engaging the terminal array of the IC card. An ejector member is movably mounted on the base member and is engageable with the IC card for movement therewith between the preload and latched positions. Latch means are provided on the base member engageable with the IC card for locking the IC card in its latched position. Biasing means are provided between the ejector member and the base member for moving the ejector member and IC card back to the preload position automatically in response to releasing the latch means.

As disclosed herein, the IC card is movable from the preload position to the latched position in an insertion direction of the card into the receptacle means. The IC card is movable in a second direction transversely of the insertion direction into engagement with the latch means. Second biasing means are provided on the base member for engaging the IC card and biasing the IC card in the second direction into engagement with the latch means. In the preferred embodiment, the biasing means is provided by a spring arm formed integral with the base member and engageable therewith.

Other features of the invention include an abutment shoulder on the ejector member engageable by a leading edge of the IC card so that the ejector member moves with the IC card from the preload position to the latched position. The latch means is formed by a latch shoulder on the base member engageable with a trailing edge of the IC card. The biasing means comprises at least one coil spring sandwiched between a portion of the base member and a portion of the ejector member.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
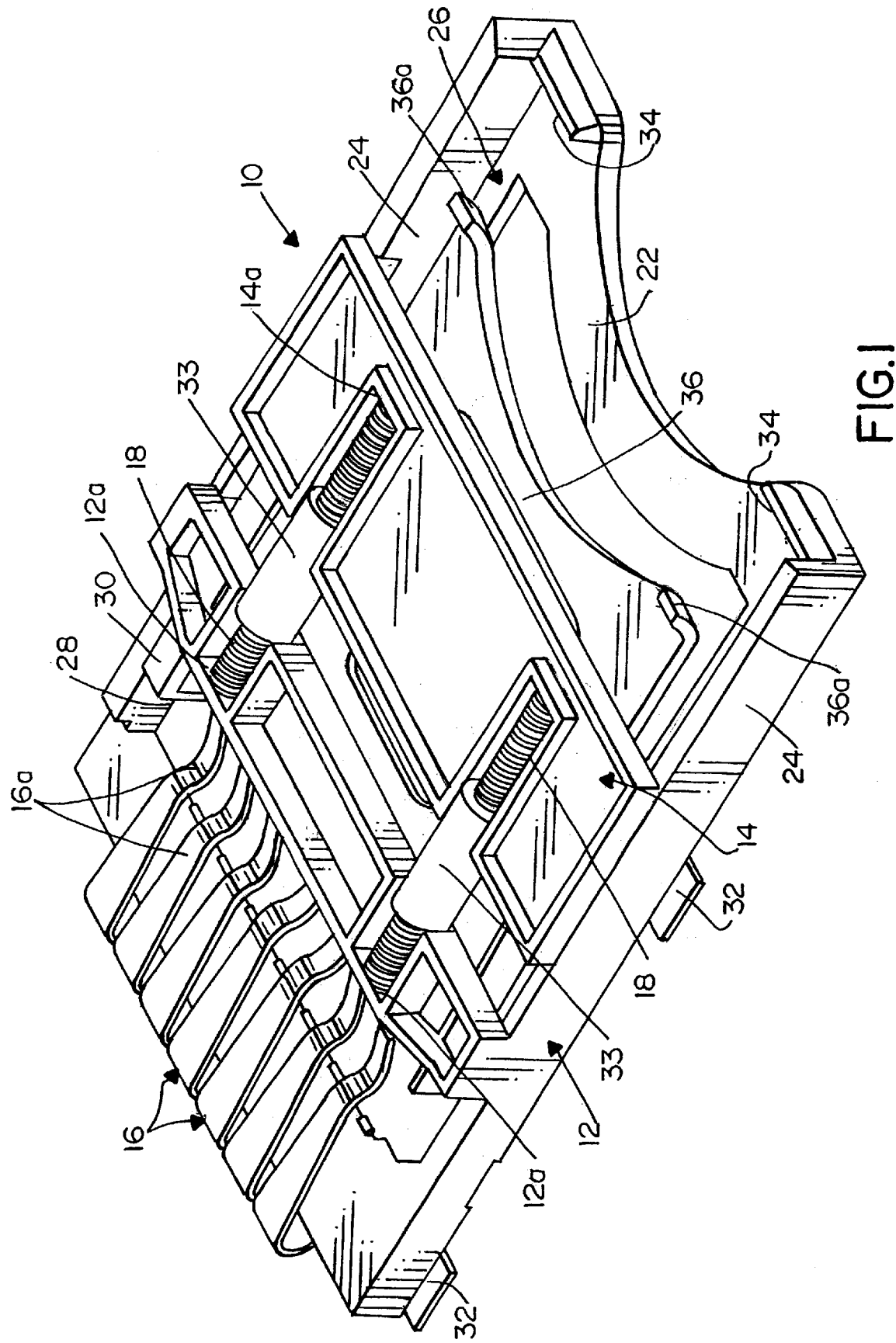
FIG. 1 is a perspective view of an IC card connector embodying the concepts of the invention.

Referring to the drawings in greater detail, and first to FIG. 1, the invention is embodied in an IC card connector, generally designated 10, which is extremely simple and includes two basic components, namely a base member, generally designated 12, and an ejector member, generally designated 14, along with a plurality of electrically conductive contacts, generally designated 16, and a pair of coil springs 18. Either one or both of base member 12 and ejector member 14 may be unitarily molded of dielectric material such as plastic or the like. Springs 18 may be fabricated of metal material. The connector is adapted for mounting on a surface of a printed circuit board.

Figure 2:
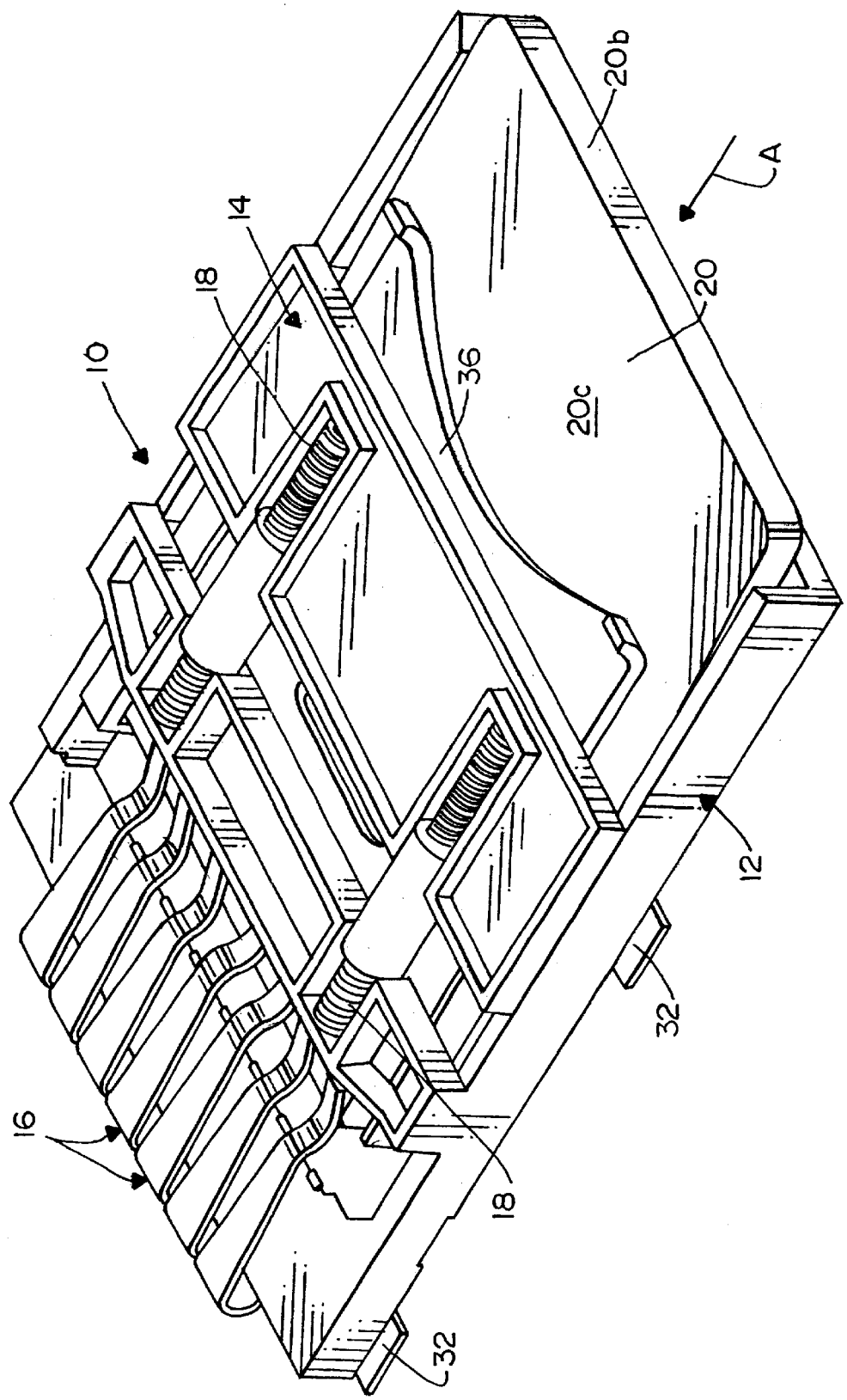
FIG. 2 is a view similar to that of FIG. 1, with an IC card inserted into the connector to a preload position.
Figure 3:
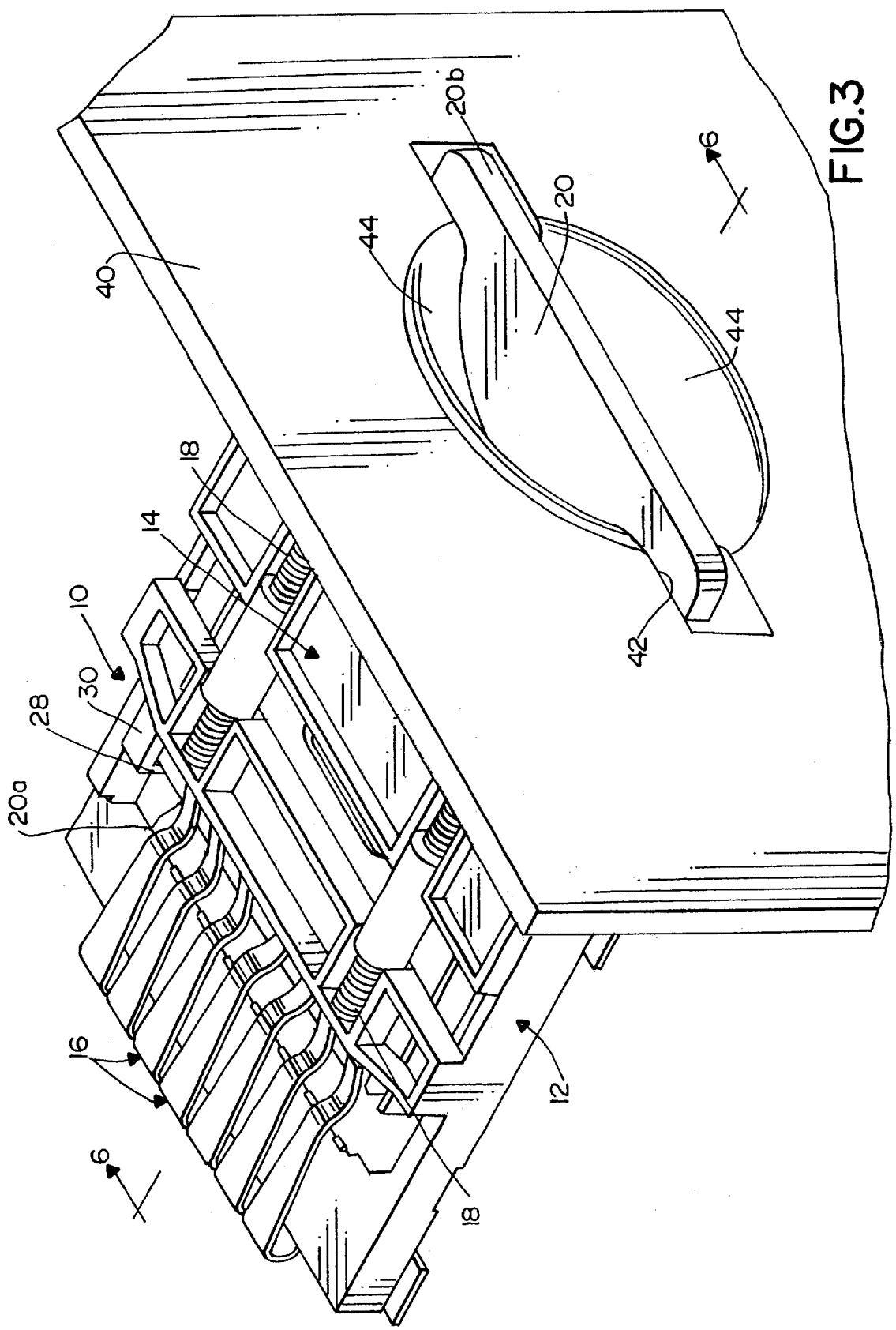
FIG. 3 is a view similar to that of FIG. 2, but with the connector mounted behind an insertion slot in a panel.
Figure 4:
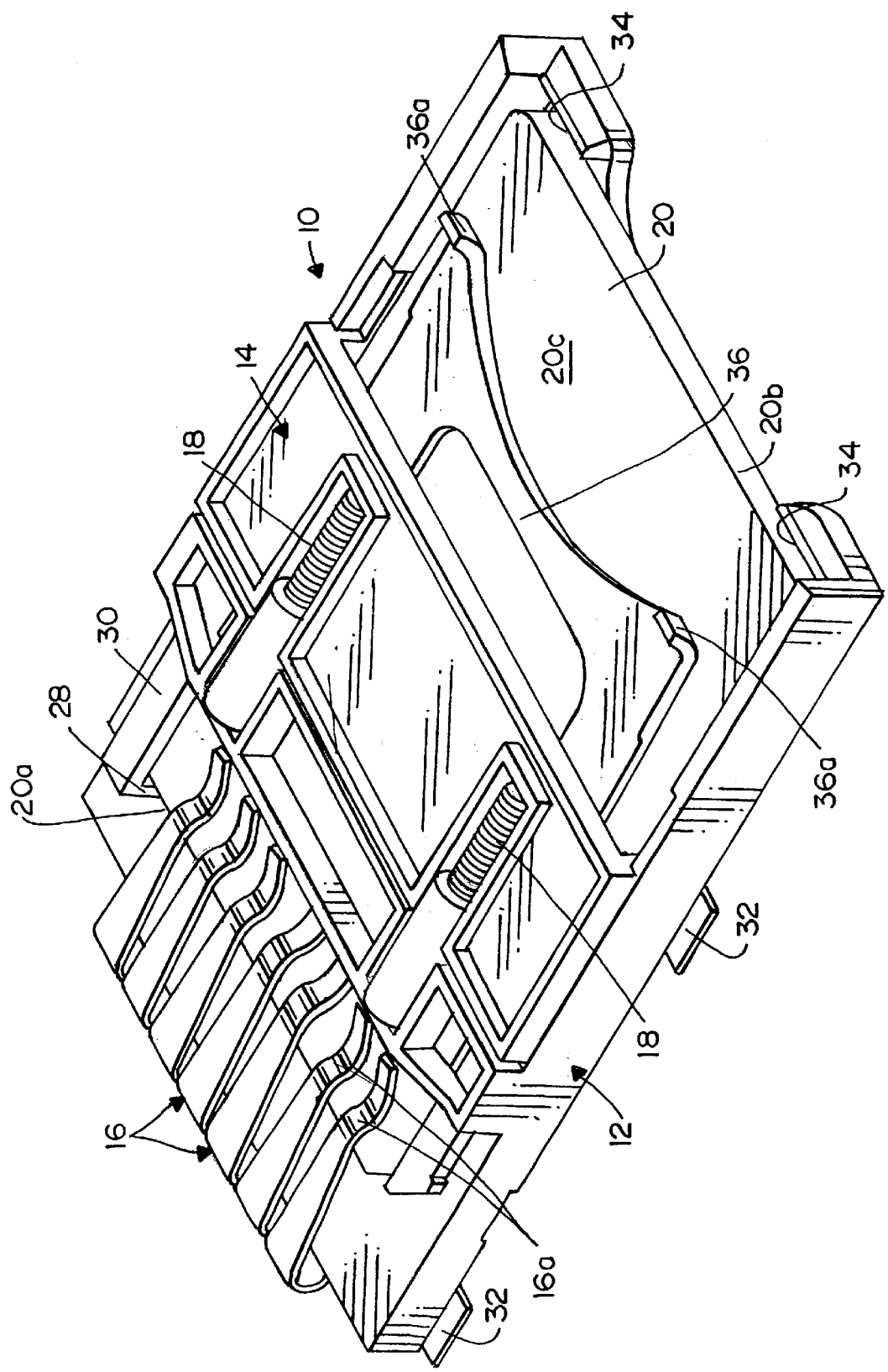
FIG. 4 is a view similar to that of FIG. 2, with the IC card and ejector member moved to a latched position.
Figure 5:
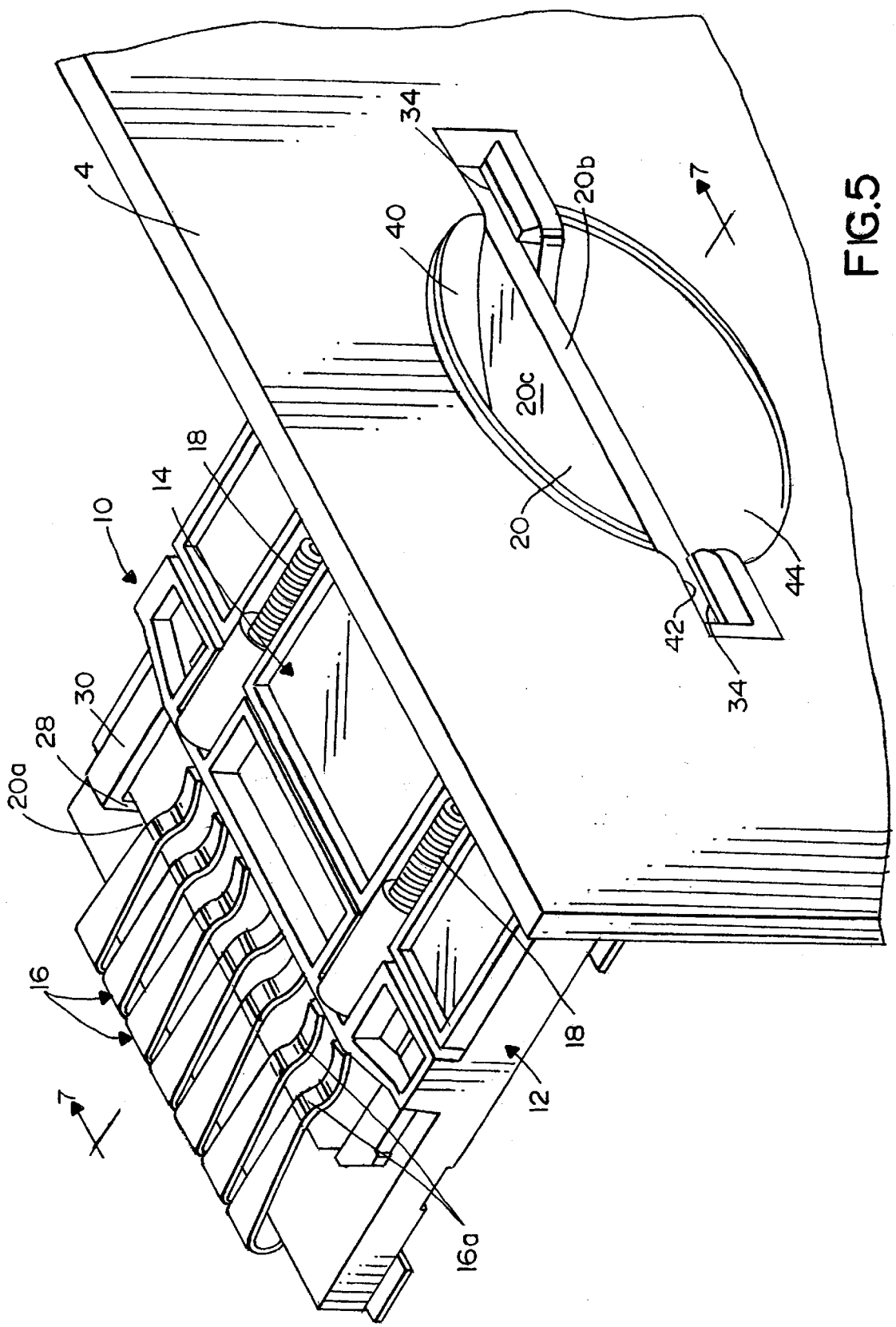
FIG. 5 is a view similar to that of FIG. 4, but with the connector mounted behind the insertion slot in the panel.
Figure 6:
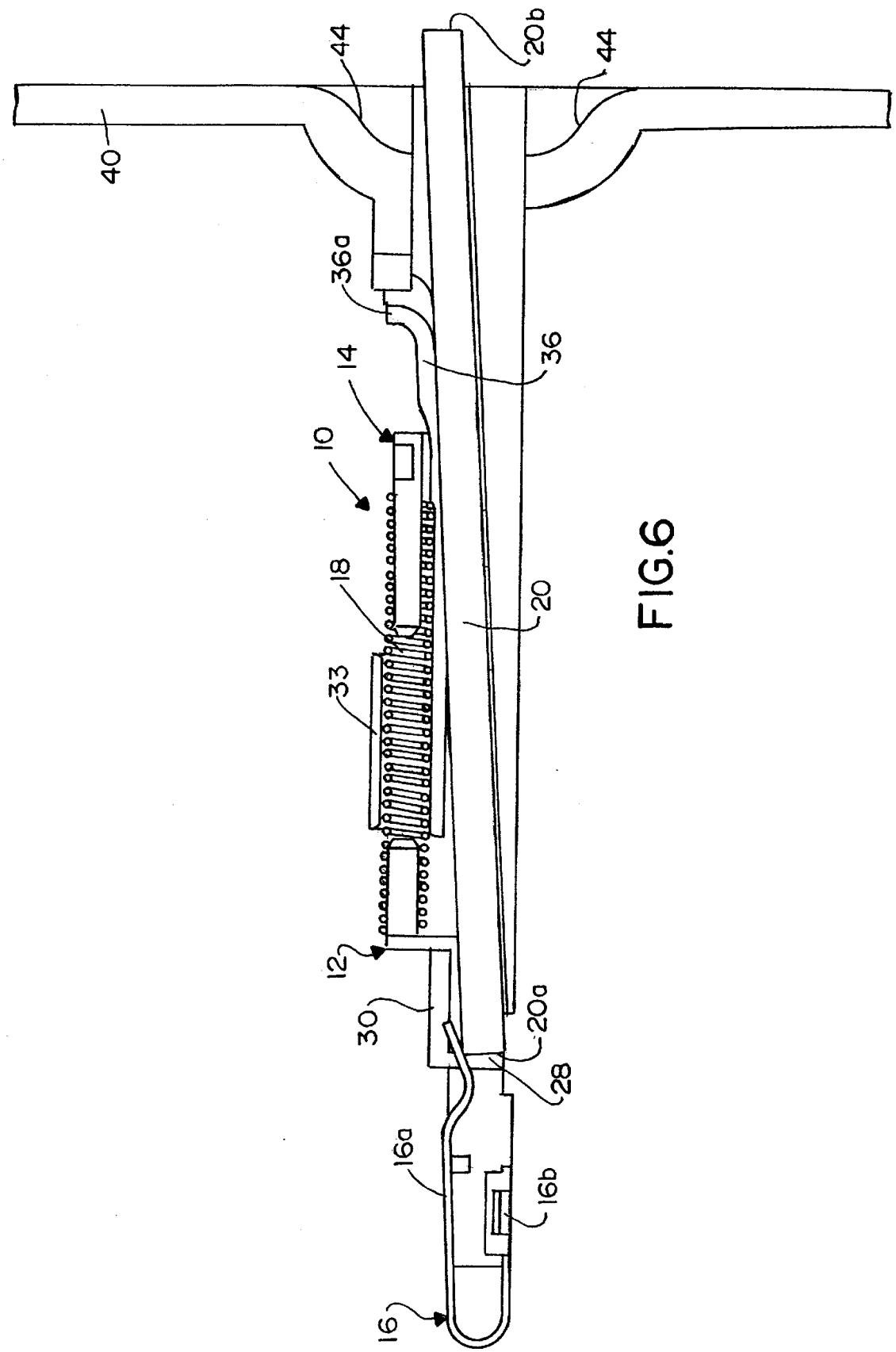
FIG. 6 is a vertical section taken generally along line 6—6 in FIG. 3.
Figure 7:
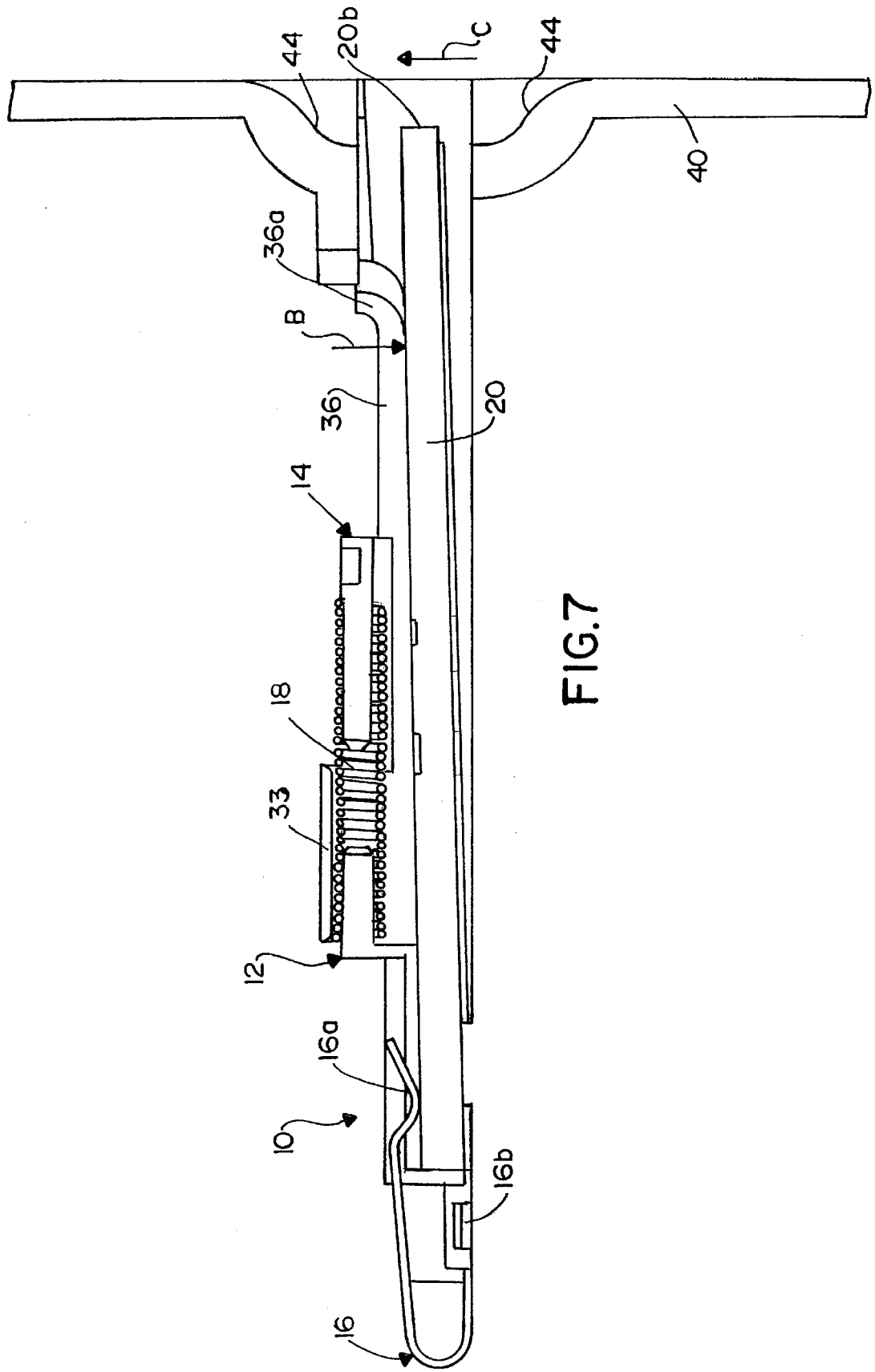
FIG. 7 is a vertical section taken generally along line 7—7 in FIG. 5.

FIGS. 2, 3 and 6 show an IC card 20 inserted into connector 10 to a preload position. FIGS. 4, 5 and 7 show the IC card moved from the preload position to a final latched or reading position. The IC card has a leading edge 20a (FIG. 4) and a trailing edge 20b (FIG. 2). The IC card is a miniature card of conventional or known construction and includes a terminal array (not shown) on a top side 20c of the card. In the preferred embodiment, the IC card is a multi media card(or "MMC") as is used in electronic devices such as videocameras and smartphones.

More particularly, base member 12 includes a bottom wall 22 (FIG. 1) and a pair of upstanding side walls 24 defining a receptacle means, generally designated 26, therebetween for receiving IC card 20 in a substantially linear insertion direction generally in the direction of arrow "A" (FIG. 2). The card can be inserted to a preload position as shown in FIGS. 2, 3 and 6. In the preload position, FIG. 6 shows that leading edge 20a of IC card 20 engages an abutment shoulder 28 which depends downwardly from each of a pair of arms 30 projecting rearwardly of ejector member 14. Therefore, any further movement of the IC card in insertion direction "A" causes the ejector member to move with the card.

Referring back to FIG. 1, conductive contacts 16 include cantilevered spring contact arms 16a for engaging the terminal array on top side 20c of the IC card as seen in FIG. 7 when the IC card is moved to its latched position described hereinafter. FIGS. 6 and 7 show that the conductive contacts are generally U-shaped and include bottom arms 16b for connection to appropriate circuit traces on the printed circuit board, as by soldering. A plurality of mounting clips or "fitting nails" 32 (FIG. 1) are insert-molded in base member 12 for connection to appropriate mounting pads on the printed circuit board, as by soldering.

Springs 18 are mounted within integral cylindrical portions 33 of ejector member 14. The springs are longitudinally sandwiched between portions 14a of the ejector member and portions 12a of base member 12.

FIG. 1 best shows that base member 12 includes a pair of latch shoulders 34 which project upwardly from bottom wall 12 at opposite sides of receptacle means 26. As will be seen hereinafter, these latch shoulders are engageable with trailing edge 20b of IC card 20. A spring arm 36 is disposed above receptacle means 26 and includes a pair of upwardly flared tabs 36a at opposite sides thereof for guiding the IC card therebeneath. Again as described hereinafter, spring arm 36 forms a biasing means for biasing the trailing edge of the IC card into engagement with latch shoulders 34.

FIGS. 3 and 5 show IC card connector 10 mounted behind a panel 40 which includes a slot 42 through which IC card 20 can be inserted into receptacle means 26 of the connector. The panel has a recessed area 44 spanning both sides of slot 42 and into which an operator's fingers can be inserted to grip the IC card.

The operation of IC card connector 10 now will be described. As stated above, IC card 20 is inserted into receptacle means 26 (FIG. 1) in a generally linear direction as indicated by arrow "A" (FIG. 2). This can be considered the first or insertion direction of the IC card. The card initially is inserted to a preload position shown in FIGS. 2, 3 and 6. In the preload position, leading edge 20a of the card engages abutment shoulders 28 of ejector member 14.

The IC card is movable from the preload position (FIGS. 2, 3 and 6) to its reading or latched position shown in FIGS. 4, 5 and 7. As the card moves to the latched position, ejector member 14 moves therewith, cocking coil springs 18 to spring-load the ejector member. In addition, when the IC card moves to its fully inserted position, trailing edge 20b of the card pass latch shoulders 34, whereupon spring arm 36 biases the IC card downwardly in the direction of arrow "B" (FIG. 7), generally transversely of insertion direction "A", so that trailing edge 20b of the card latches behind shoulders 34 of the base member. In this position, contact arms 16a of conductive contacts 16 appropriately engage the terminal array on the top side of the card.

When an operator desires to remove the IC card from connector 10, the operator inserts a finger into recessed area 44 beneath the IC card and flips the trailing edge 20b of the card upwardly in the direction of arrow "C" so that the trailing edge of the card disengages from latch shoulders 34, while moving spring arm 36 upwardly therewith. Once the trailing edge of the card is disengaged from the latch shoulders, coil springs 18 are effective to bias ejector member 14 and the IC card back outwardly, opposite insertion direction "A", from the latched position to the preload position as shown in FIG. 6. In other words, the springs are operative to move the ejector member and IC card back to the preload position automatically in response to releasing the latch means provided by latch shoulders 34 engaging the trailing edge of the card.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An IC card connector for connecting an IC card having a terminal array, comprising:

a base member having receptacle means for receiving the IC card for movement in an insertion direction between a preload position and a latched position, the base member including a plurality of electrically conductive contacts for engaging the terminal array of the IC card;

an ejector member movably mounted on the base member and engageable with the IC card for movement therewith between said preload and latched positions;

latch means on the base member engageable with the IC card for locking the IC card in its latched position;

first biasing means on the base member for engaging the IC card and biasing the IC card in a second direction transversely of said insertion direction into engagement with said latch means; and second biasing means operatively associated between the ejector member and the base member for moving the ejector member and IC card back to said preload position automatically in response to releasing said latch means.

2. The IC card connector of claim 1 wherein said first biasing means is integral with the base member.

3. The IC card connector of claim 2 wherein said first biasing means comprises a spring arm unitary with the base member and engageable with the IC card.

4. The IC card connector of claim 1 wherein said first biasing means comprises at least one coil spring sandwiched between a portion of the base member and a portion of the ejector member.

5. The IC card connector of claim 1 wherein said ejector member includes an abutment shoulder engageable by a leading edge of the IC card so that the ejector member moves with the IC card from the preload position to the latched position.

6. The IC card connector of claim 1 wherein said latch means comprises a latch shoulder on the base member engageable with a trailing edge of the IC card.

7. The IC card connector of claim 1 wherein said IC card is movable from the preload position to the latched position in an insertion direction of the IC card into the receptacle means, and the IC card is movable in a second direction transversely of said insertion direction into engagement with said latch means.

8. The IC card connector of claim 7 wherein said ejector member includes an abutment shoulder engageable by a leading edge of the IC card so that the ejector member moves with the IC card from the preload position to the latched position.

9. The IC card connector of claim 7 wherein said latch means comprises a latch shoulder on the base member engageable with a trailing edge of the IC card.

10. An IC card connector for connecting an IC card having a terminal array, comprising:

- a base member having receptacle means for receiving the IC card for movement in an insertion direction between a preload position and a latched position, the base member including a plurality of electrically conductive contacts for engaging the terminal array of the IC card;
- an ejector member movably mounted on the base member and having an abutment shoulder engageable with a leading edge of the IC card for movement therewith between said preload and latched positions;
- at least one latch shoulder on the base member engageable with a trailing edge of the IC card for locking the IC card in its latched position;
- first biasing means on the base member for engaging the IC card and biasing the IC card in a second direction transversely of said insertion direction into engagement with said latch shoulder; and
- second biasing means operatively associated between the ejector member and the base member for moving the ejector member and IC card back to said preload position automatically in response to moving the trailing edge of the IC card out of engagement with said latch shoulder.

11. The IC card connector of claim 10 wherein said first biasing means is integral with the base member.

12. The IC card connector of claim 11 wherein said first biasing means comprises a spring arm unitary with the base member and engageable with the IC card.

13. The IC card connector of claim 10 wherein said second biasing means comprises at least one coil spring sandwiched between a portion of the base member (12) and a portion of the ejector member.

\* \* \* \* \*